Jan. 31, 1950     J. W. GROHS     2,496,090
ICE FISHING TIPUP
Filed May 10, 1947
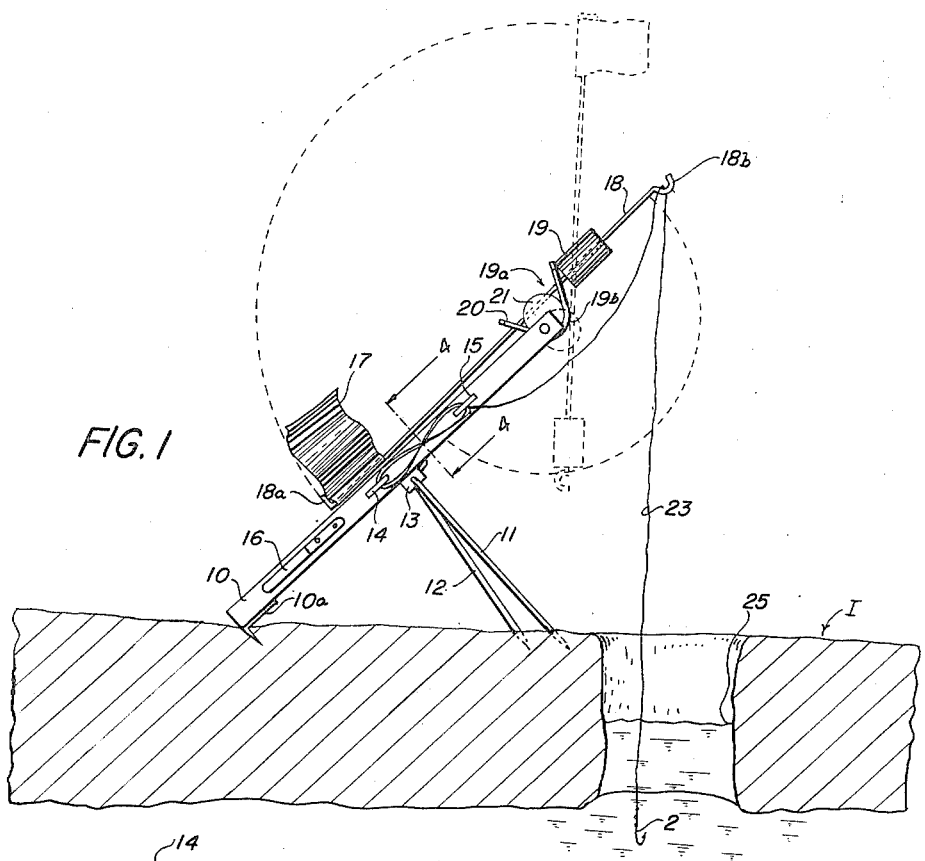
FIG. 1
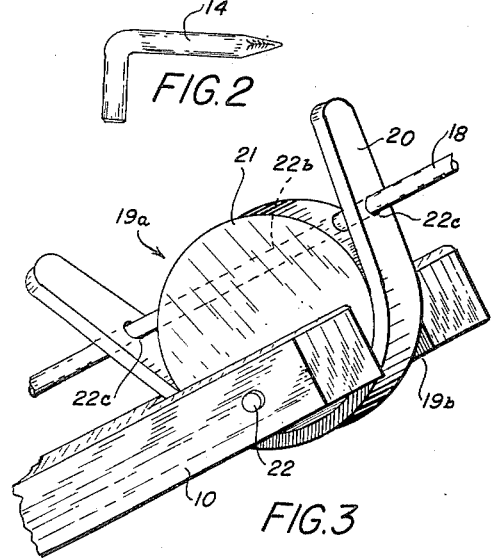
FIG. 2
FIG. 3
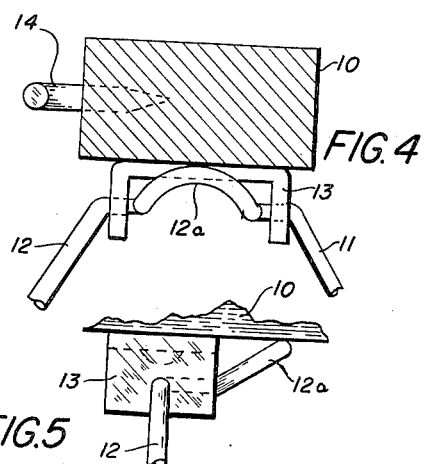
FIG. 4
FIG. 5
INVENTOR.
JOHN W. GROHS
BY
H. G. Manning
ATTY.

Patented Jan. 31, 1950

2,496,090

UNITED STATES PATENT OFFICE 2,496,090

ICE FISHING TIPUP

John W. Grohs, Torrington, Conn.

Application May 10, 1947, Serial No. 747,273

2 Claims. (Cl. 43—17)

This invention relates to fishing apparatus, and more particularly to a tip-up which will produce visible and audible signals to indicate a strike by a fish.

One object of this invention is to provide a device of the above nature having a pivoted signal rod, which is readily adjustable longitudinally, whereby the rod will be sensitive to any desired degree of pull upon a fish line.

Another object is to provide a device of the above nature having a pivoted signal rod which is instantly adjustable, and which may be securely held in any adjusted position.

Another object is to provide a device of the above nature having a line clip which will also serve as an audible alarm signal.

A further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawing one form in which the invention may conveniently be embodied in practice.

In the drawing,

Fig. 1 represents an elevational view of the tip-up, showing its mode of installation upon an ice-covered body of water.

Fig. 2 is a view showing one of the reeling pins.

Fig. 3 is a perspective view on an enlarged scale, showing details of the adjustable pivoted rod holder.

Fig. 4 is a cross sectional view of the beam on the line 4—4 of Fig. 1, showing details of the leg mounting.

Fig. 5 is a view of the leg mounting taken at right angles to Fig. 4.

Referring now to the drawing in which like reference numerals denote corresponding parts throughout the several views, the numeral 10 indicates a rectangular wooden beam having an angular spike 10a riveted to its lower end and adapted to be driven into the ice I. The beam 10 is supported in an inclined position on the ice I by means of a pair of wire legs 11, 12, integrally connected by an upper stop portion 12a adapted to bear against the beam 10, and said legs are swingably mounted in the side arms of a U-shaped aperture bracket 13 secured to said beam 10 as by rivets. Upon one side of the beam 10 and arranged centrally thereof are a pair of oppositely disposed angular reeling pins 14, 15 adapted to have a length of fishline wound thereon. A line clip 16 also is secured upon the same side of the lower portion of the beam 10, said clip 16 having a vibratory free end which is offset from the beam 10, and which may be used for holding portions of the fishline which are not in use.

The tip-up signal comprises a flag 17 preferably of red cloth, secured on the end of a rod 18 and retained thereon by bending the extremity 18a thereof at right angles. The signal rod 18 is formed at its other end with a hook 18b which serves as a stop for a slidable weight 19 mounted on said rod.

The signal rod 18 is centrally supported by an adjustable rod mounting 19a located in an upper forked end 19b of the beam 10.

This rod mounting 19a comprises a U-shaped spring clip 20 which embraces a circular eccentric disk 21 which serves as a tilting rod holder. A pivot pin 22 passes eccentrically laterally through the disk 21 and is mounted in the forked end 19b of the beam 10.

In order to hold the signal rod 18 in any desired longitudinal position with respect to the eccentric disk 21, the latter is provided with a rod-receiving bore 22b formed as a chord of the annular disk 21, and apertures 22c are provided in the legs of the U-shaped spring 20. The latter apertures 22c are of a diameter somewhat greater than the diameter of the rod 18, and are located in such a position that when the ends of the U-shaped clip 20 are flexed towards each other, said apertures 22c will be in alignment with the bore 22b of the disk 21 permitting free movement of the rod 18. However, when the legs of the U-shaped spring clip 20 are allowed to normally flex outwardly, they will securely grip the rod 18 and prevent any longitudinal movement thereof.

The fishline 23 is reeled upon the pins 14, 15 in a manner to leave the desired length of the line available for fishing. The line 23 will then be passed over the hook 18b on the end of the signal rod 18. A fish hook 2 on the end of the line 23 will then be dropped through a hole 25 of suitable diameter chopped through the ice I at a location below the hook 18b.

Operation

In operation, the lower end of the beam 10 will be held by the spike 10a driven into the ice I and the beam will be supported in an inclined position by means of the legs 11, 12. The signal rod will be tipped back in order to lower the flag 17 into the position shown in full lines in Fig. 1, this operation also causing the weight 19 to slide into contact with the U-shaped spring clip 20. The fish line 23 will now be unreeled from the pins 14, 15 to provide a length of line satisfactory to the fisherman, and the hook 2 having been baited, the line 23 will be passed over the hook 18b of the signal rod 18, in order to support the hook 2 in the water.

The fisherman will now adjust the signal rod 18 longitudinally to provide the desired degree of sensitivity. This adjustment may be made by forcibly pushing the rod 18 through the bore 22b of the disk 21 and the apertures 22c of the legs of the clip 20, this adjustment being facilitated by pinching said legs toward each other.

Upon release of the spring clip 20, the legs thereof will spring outwardly to firmly bind the rod 18 in place.

It will be seen that the longitudinal adjustment of the rod 18 may be infinitely varied, since the rod mounting means 19a avoids the use of any notches, holes, or other fixed abutments used in the prior art, which provide only a step-by-step adjustment of the signal rod. It will be also understood that the signal rod 18 may be adjusted to such a position that the sliding weight 19 will be only slightly overbalanced by the weight of the flag 17 and the portion of the rod 18 to the left of the mounting means 19a, so that even a slight impulse upon the fishing line 23 will pull the hook 18b downwardly to cause the flag 17 to rise with the signal rod 18 into the position shown in dotted lines in Fig. 1.

This movement will, of course, cause the sliding weight 19 to move outwardly into abutment with the hook 18b, and the rod 18 will thereby be held in the erect dotted line position until the fish is removed and the tip-up is reset by the fisherman.

One advantage of the invention is that when the flag 17 is tripped, the momentum of the weight 19 will cause it to swing past the dotted line position in Fig. 1 and strike the beam 10 with a sharp impact. This impact will cause the beam and bottom offset line clip 16 to vibrate thereby causing a sound which can be heard for some distance in the event that the fisherman is not close at the moment.

While there has been disclosed in this specification one form in which the invention may be embodied, it is to be understood that this form is shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a tip-up, a beam adapted to be mounted in an inclined position, a signal rod having means to support a fish line at one end thereof, and means for pivotally mounting said rod upon said beam, said mounting means including a clamp for gripping the center portion of said rod at any desired point, wherein said clamp includes a disk eccentrically pivoted on said beam, said disk having a bore shaped to receive said rod, and a U-shaped leaf spring embracing said disk and having apertures also shaped to receive said rod.

2. The invention as defined in claim 1, wherein the legs of the U-shaped spring are normally non-parallel and are urged to a position so that the apertures of the U-shaped spring are out of alignment with the bore of the disk, and wherein the signal rod disposed in said bore will normally frictionally engage the edges of the apertures of said spring and when said spring is flexed the rod will be freely movable therein.

JOHN WM. GROHS.

REFERENCES CITED

The following references are of record in the file of this patent:

UNITED STATES PATENTS

| Number | Name | Date |
| --- | --- | --- |
| 467,123 | Kunzel | Jan. 12, 1892 |
| 962,309 | Butler | July 21, 1910 |
| 1,132,158 | Brewer | Mar. 16, 1915 |
| 1,406,038 | Larsen | Feb. 7, 1922 |
| 1,523,042 | Thomas | Jan. 13, 1925 |
| 1,743,442 | Fanslau et al. | Jan. 14, 1930 |
| 1,800,607 | Decker | Apr. 14, 1931 |
| 1,815,402 | Fisher | July 21, 1931 |
| 1,996,704 | Hawkinson | Apr. 2, 1935 |
| 2,089,452 | Utley | Aug. 10, 1937 |
| 2,136,864 | Paquette | Nov. 15, 1938 |
| 2,283,092 | Rosen | May 12, 1942 |

FOREIGN PATENTS

| Number | Country | Date |
| --- | --- | --- |
| 431,089 | Germany | June 21, 1926 |